July 13, 1937. J. W. LEE 2,087,109
AUTOMATIC SCREW MACHINE
Filed March 11, 1936 9 Sheets-Sheet 1

INVENTOR
John W. Lee
BY Ralph H. Chilton
ATTORNEY

July 13, 1937.  J. W. LEE  2,087,109
AUTOMATIC SCREW MACHINE
Filed March 11, 1936  9 Sheets-Sheet 3

INVENTOR
John W. Lee
BY Ralph H. Chilton
ATTORNEY

July 13, 1937.  J. W. LEE  2,087,109

AUTOMATIC SCREW MACHINE

Filed March 11, 1936  9 Sheets-Sheet 5

INVENTOR
John W. Lee
BY Ralph H. Chilton
ATTORNEY

July 13, 1937.   J. W. LEE   2,087,109
AUTOMATIC SCREW MACHINE
Filed March 11, 1936   9 Sheets-Sheet 7

INVENTOR
John W. Lee
BY Ralph H. Chilton
ATTORNEY

July 13, 1937.　　　　　J. W. LEE　　　　　2,087,109
AUTOMATIC SCREW MACHINE
Filed March 11, 1936　　　9 Sheets-Sheet 8
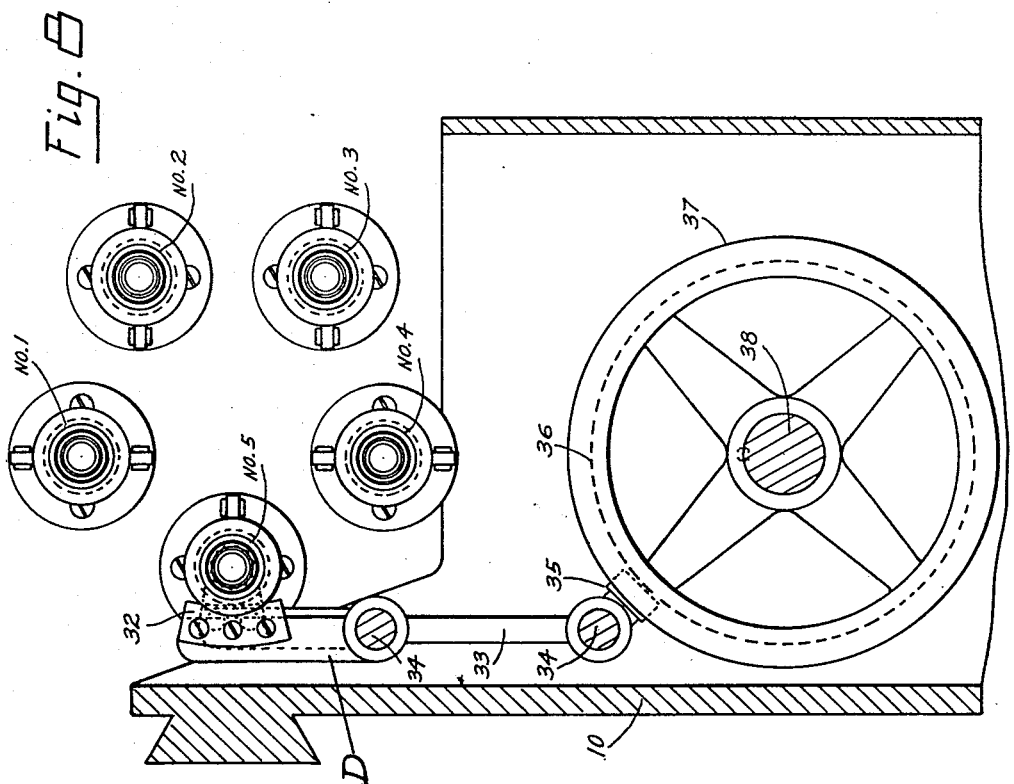
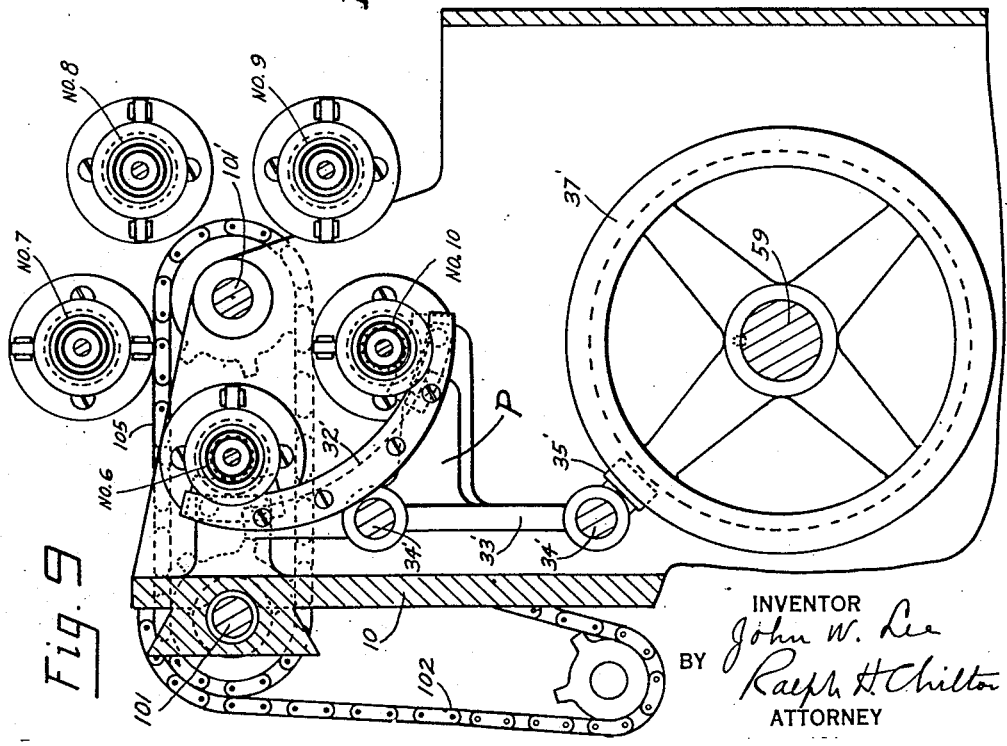
INVENTOR
John W. Lee
BY Ralph H. Chilton
ATTORNEY July 13, 1937.  J. W. LEE  2,087,109
AUTOMATIC SCREW MACHINE
Filed March 11, 1936   9 Sheets-Sheet 9

INVENTOR
John W Lee
BY Ralph H. Chilton
ATTORNEY

Patented July 13, 1937

2,087,109

UNITED STATES PATENT OFFICE 2,087,109

AUTOMATIC SCREW MACHINE

John W. Lee, Dayton, Ohio

Application March 11, 1936, Serial No. 68,155

14 Claims. (Cl. 29—36)

This invention relates to automatic screw-machines.

An object of this invention is to provide improvements in automatic screw-machines whereby both ends of the work-piece may be completely machined without requiring rechucking by hand to finish machining the cut-off end of the work-piece.

Further objects and advantages of the present invention will be apparent from the following description, reference being had to the accompanying drawings wherein a preferred embodiment of the present invention is clearly shown.

Heretofore automatic screw-machines have been able to finish all portions of the work-piece except the cut-off end thereof (i. e. the end of the piece where it is finally cut off from the bar stock), such for instance as to drill axial holes into the cut-off end. To drill such axial holes it has heretofore been necessary to re-chuck the work-piece by hand, which necessarily is relatively costly.

Now by this invention a secondary spindle-head is provided, similar to the primary spindle head, but having its first spindle position in exact alignment with the last or cut-off spindle position of the primary head. Just before the work-piece is cut off from its long bar stock in the primary head, the long bar is projected forward until the finished outer end of the work-piece is projected into the spindle in the first position on the secondary head (which is in exact alignment therewith) and is there gripped by an automatic chuck, the spindles of both spindle-heads rotating on their own axes at exactly the same speed to permit this. The rotating work-piece is then cut off by an ordinary cut-off tool and it is thereafter free from the primary spindle-head but is maintained accurately gripped in the secondary spindle-head but with its cut-off end projecting therefrom. Hence the work-piece is thereafter free to be indexed to the various positions on the secondary spindle-head and to have its projecting cut-off end operated upon by both side-cutting tools and end-cutting tools in any desired manner. The secondary spindle-head has an opposed tool carriage and preferably also a laterally moving tool-slide for holding the end-cutting tools and side-cutting tools respectively. These parts may be identical with or similar to the corresponding tool carriage and tool slide for the primary spindle head. Thus it is seen that the machine of this invention may be in effect a double automatic screw-machine, the primary units of which operate upon the work-piece when it is chucked at one end thereof, and the secondary units of which operate upon the work-piece when it is chucked at the other end thereof. The primary and secondary spindle-heads face each other but are laterally offset so that the last position spindle of the primary head is in direct alignment with the first position spindle of the secondary head, as explained above. The two spindle-heads are intermittently indexed in opposite directions but their individual spindles rotate in the same direction and preferably at the same speed in order to facilitate the transfer of the work-piece from the primary to the secondary spindle-head, as above explained.

In the drawings:

Fig. 8 is a vertical transverse section taken on line 8—8 of Fig. 6.

Fig. 9 is a vertical transverse section taken on line 9—9 of Fig. 7.

Figure 10:
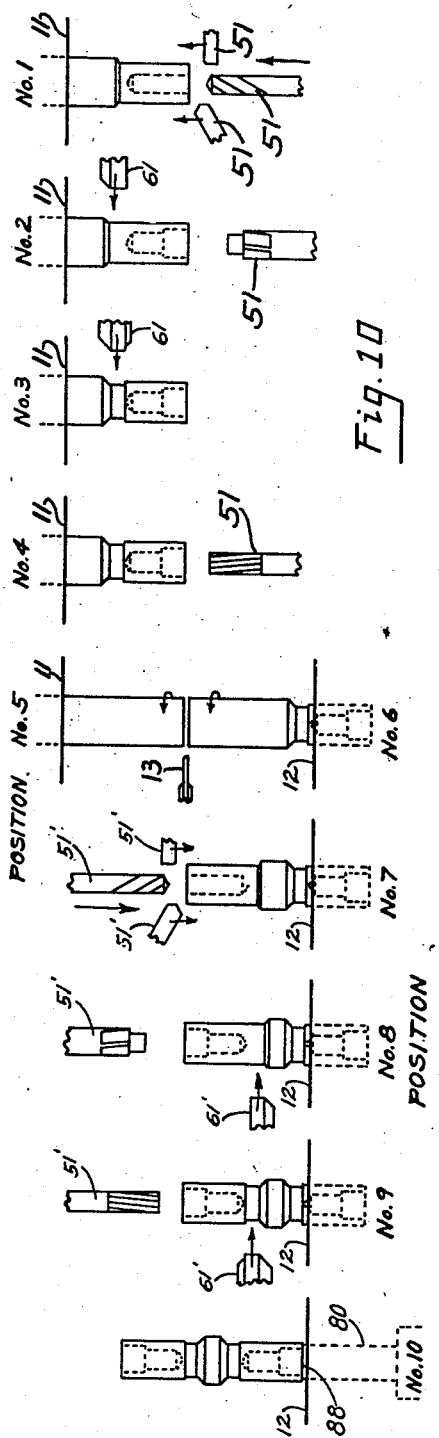

Fig. 10 is a diagrammatic view showing the sequence of operations on the work-piece as it moves through the positions Nos. 1, 2, 3, 4, and 5 on the primary spindle-head and thence through the positions Nos. 6, 7, 8, 9, and 10 on the secondary spindle-head, until the finished work-piece is knocked out at position 10.

Figure 11:
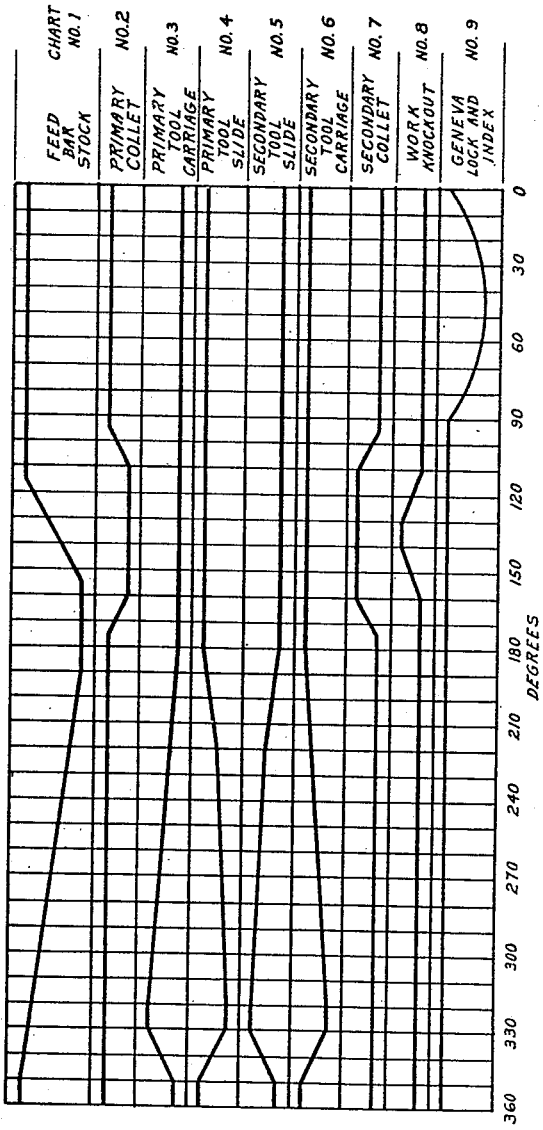

Fig. 11 is a time-chart showing the relative movements of the main operating parts of the machine during one complete cycle of operation of 360 degrees. All the main parts of the machine in all the other figures are shown in their zero position which is represented by the zero-degree position in Fig. 11.

Figure 3:
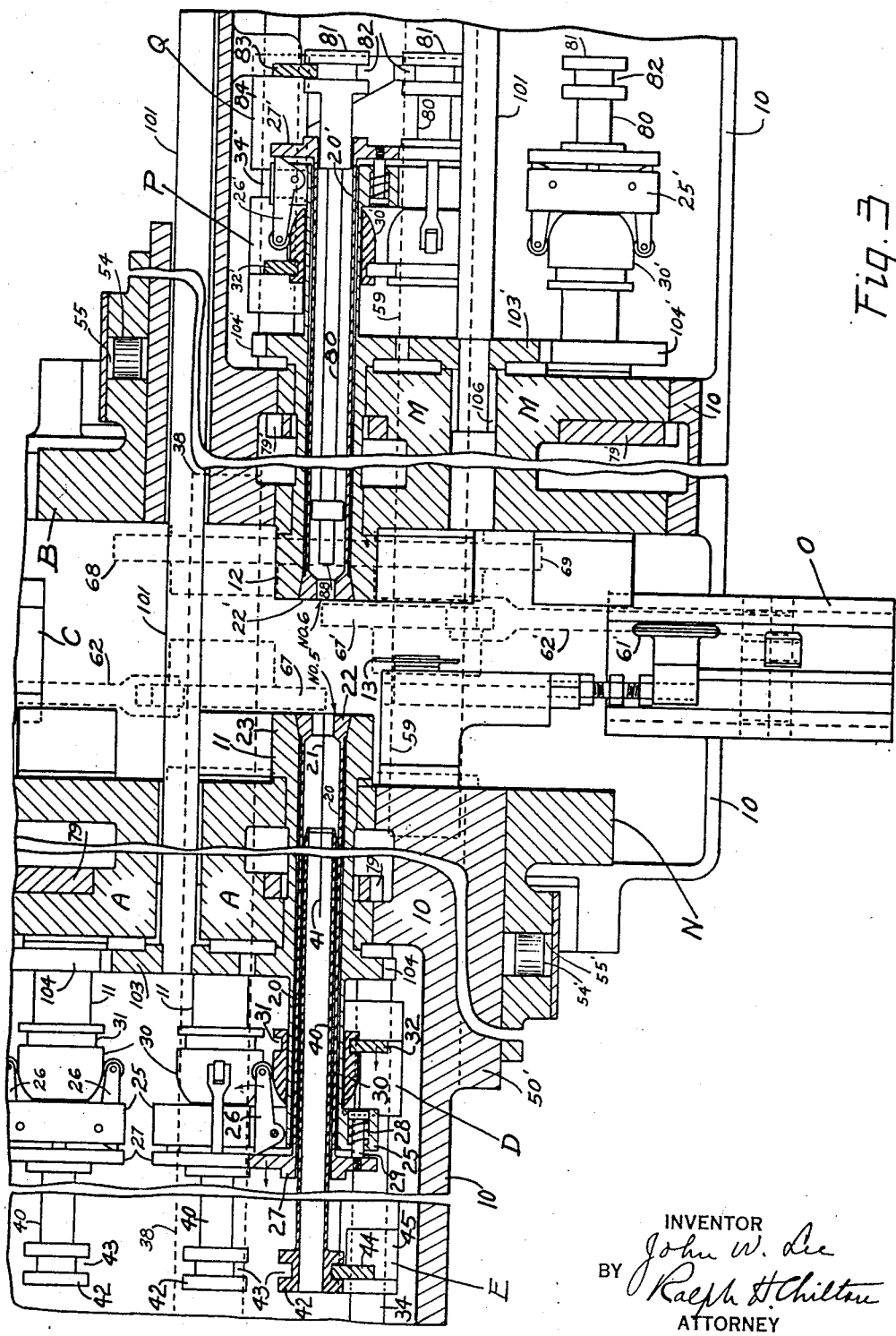
Fig. 3 is a horizontal section taken on line 3—3 of Figs. 2, 4, and 5.
Figure 6:
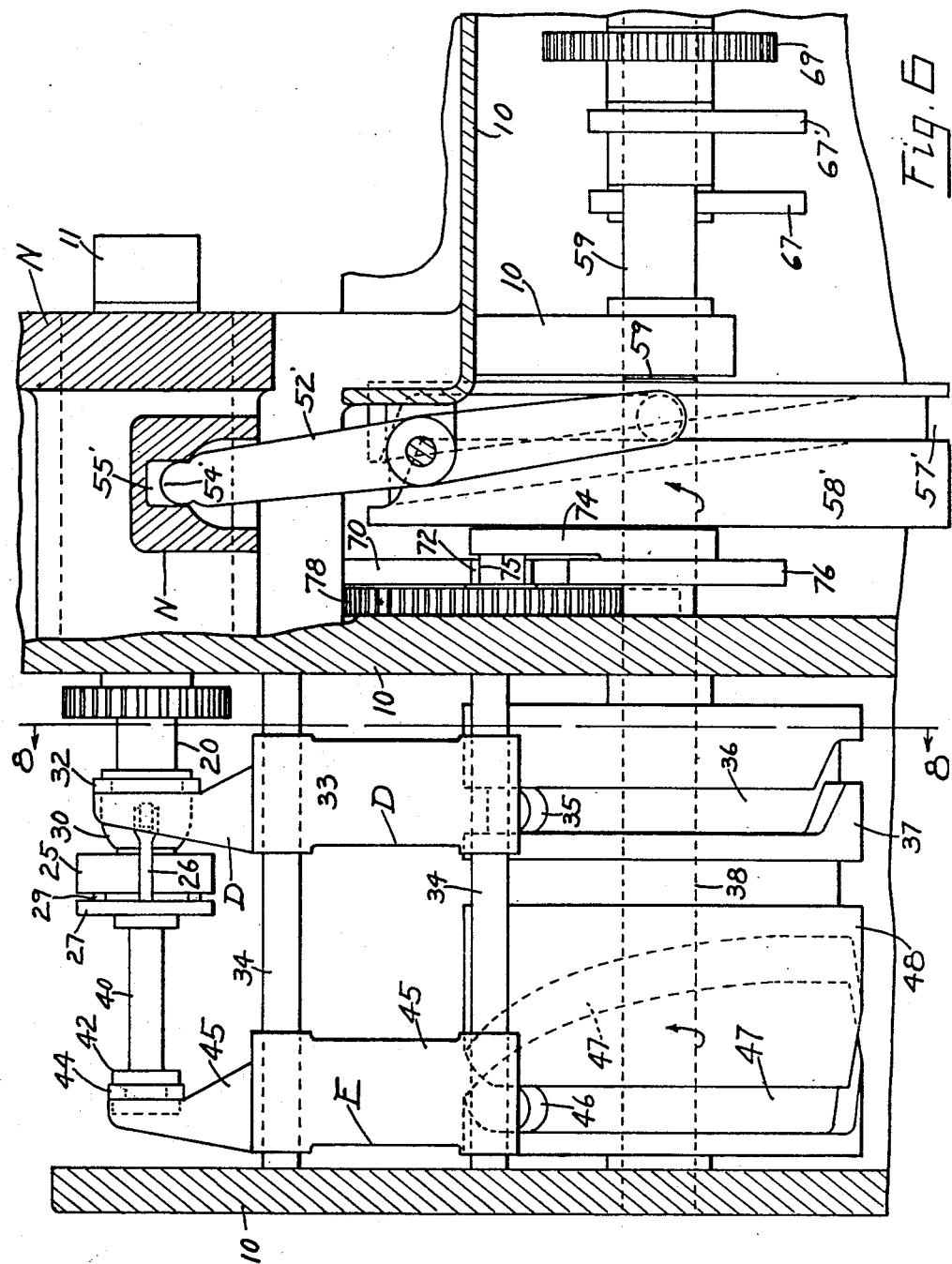
Fig. 6 is a vertical longitudinal section taken on the offset line 6—6 of Fig. 1.

In Fig. 11:

The first or topmost time-chart shows the timing of the feeding of the bar stock to the right while in position 5 of the primary spindle head by the means best shown in Figs. 3 and 6. This feeding movement of the bar-stock begins at 115° and ends at 155°.

The second time-chart shows the timing of the opening and closing of the primary collet to permit the feeding movement of the bar-stock indicated by the first time-chart (see Figs. 3, 6, and 8).

The third time-chart shows the timing of the forward and return movement of the primary tool carriage for the end cutting of the work-piece at positions Nos. 1 to 4 of the primary spindle-head, the forward movement extending from 180° to 330° and the return movement extending from 330° to 350° (see Figs. 5, 7, and 10).

The fourth time-chart shows the timing of the forward and return movement of the primary tool slide for the side cutting of the work-piece at possible positions 1 to 4 of the primary spindle-head, the forward movement extending from 180° to 330° and the return movement from 330° to 350° (see Figs. 4 and 10).

The fifth time-chart shows the timing of the forward and return movement of the secondary tool-slide for the side cutting of the work-piece at possible positions 7, 8, and 9 of the secondary spindle-head, the forward movement extending from 180° to 330° and the return movement from 330° to 350° (see Figs. 4 and 10).

The sixth time-chart shows the timing of the forward and return movement of the secondary tool-carriage for the end cutting of the work-piece at possible positions 7, 8, and 9 of the secondary spindle-head, the forward movement extending from 180° to 330° and the return movement from 330° to 350° (see Figs. 4, 6, and 10).

The seventh time-chart shows the timing of the opening and closing of the secondary collet at positions 6 and 10 to permit the outer end of the work-piece to pass into and be gripped thereby in position 6 of the secondary spindle-head when the bar-stock is fed forward in position 5 of the primary spindle-head and to permit the ejection of the work-piece in position 10. Note that the timing of the secondary collet coincides throughout with the timing of the primary collet shown by time-chart No. 2 (see Figs. 3, 7, and 9).

Figure 7:
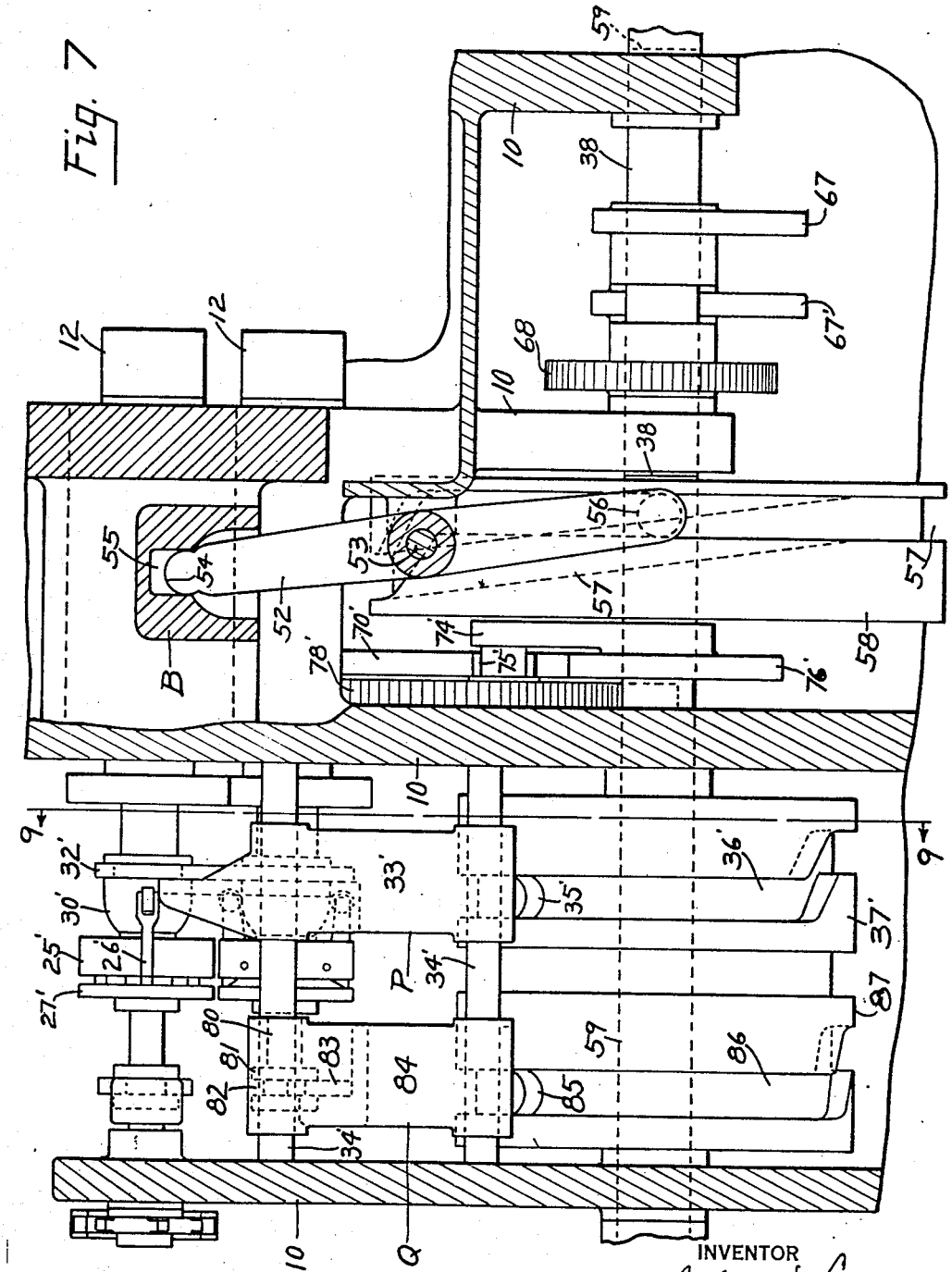
Fig. 7 is a vertical longitudinal section taken on the offset line 7—7 of Fig. 1.

The eighth time-chart shows the timing of the forward and return movement of the knock-out plunger for removing the finished work-piece at position 10 of the secondary spindle-head, the forward and return movement of the knock-out plunger being completed while the secondary collet in position 10 remains open between 110° and 160° as shown by time-chart No. 8 (see Figs. 3 and 7). In the diagrammatic Fig. 10 the knock-out plunger is shown as having fully ejected the work-piece.

Figure 4:
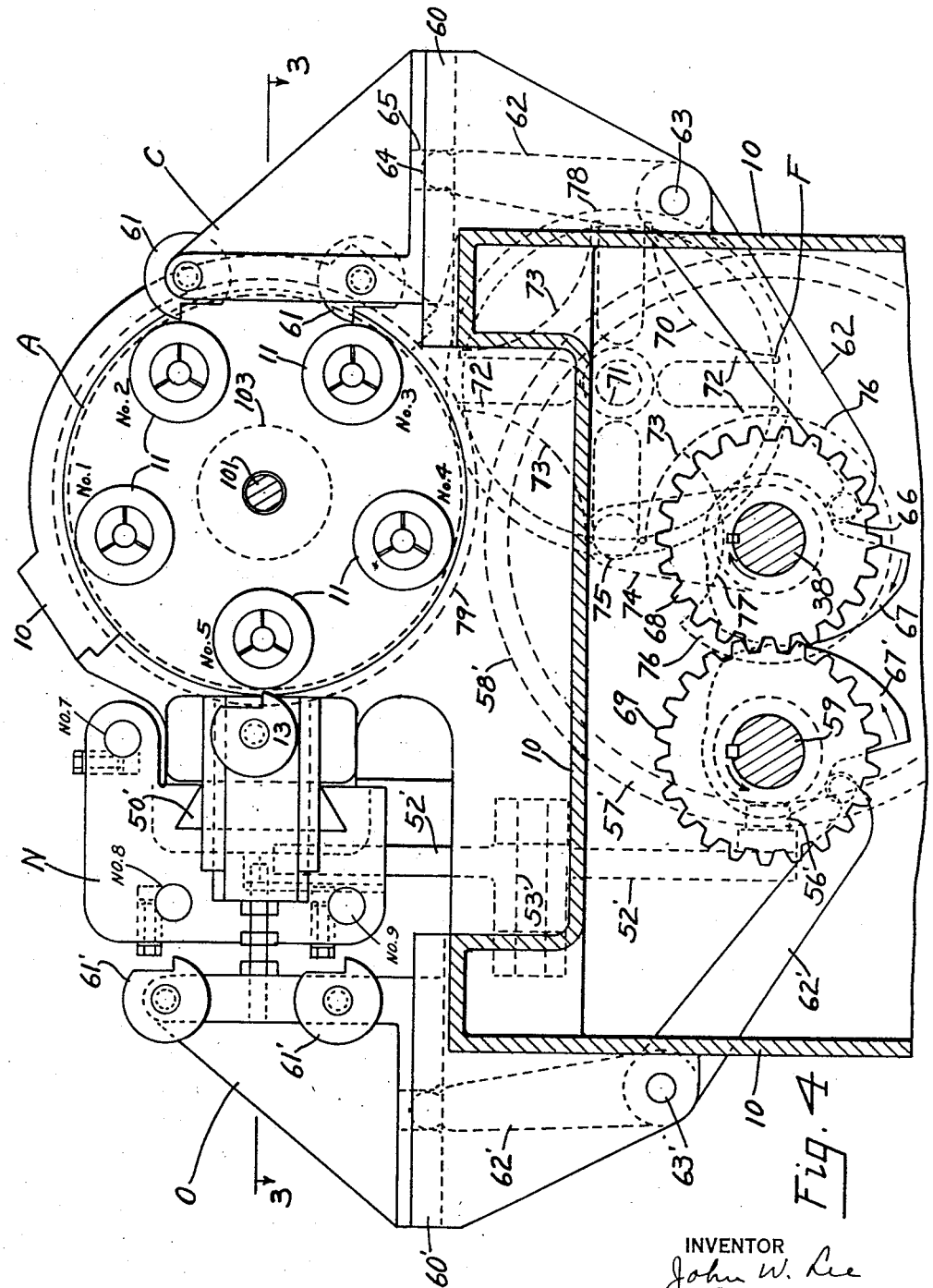
Fig. 4 is a vertical transverse section taken on line 4—4 of Fig. 1.
Figure 5:
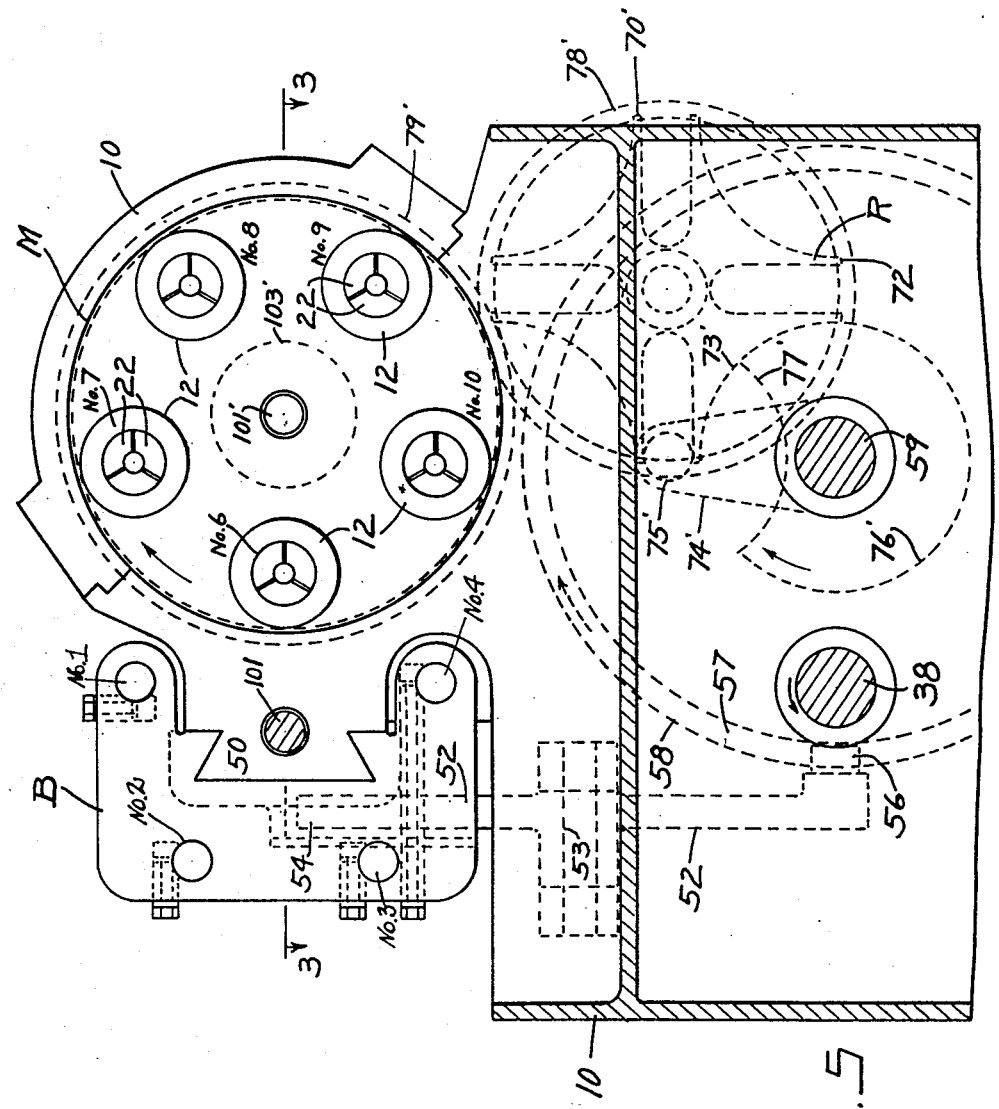
Fig. 5 is a vertical transverse section taken on line 5—5 of Fig. 1.

The ninth time-chart shows the timing of the two Geneva lock and indexing mechanisms for indexing the primary and secondary spindle-heads, the entire indexing movement occurring between 0° and 90° while all other intermittently movable parts remain stationary (see Figs. 4 and 5).

In the drawings the same reference-characters refer to the same parts throughout the several views.

In order to simplify the description the various main groups of mechanism will be designated by reference-letters as follows:

A designates the primary spindle-head.
B designates the primary tool-carriage.
C designates the primary tool-slide.
D designates the primary spindles' chucking mechanisms.
E designates the primary spindles' feeding mechanisms.
F designates the primary indexing mechanism.
M designates the secondary spindle-head.
N designates the secondary tool carriage.
O designates the secondary tool-slide.
P designates the secondary spindles' chucking mechanisms.
Q designates the secondary spindles' knock-out mechanisms.
R designates the secondary indexing mechanism.

Figure 1:
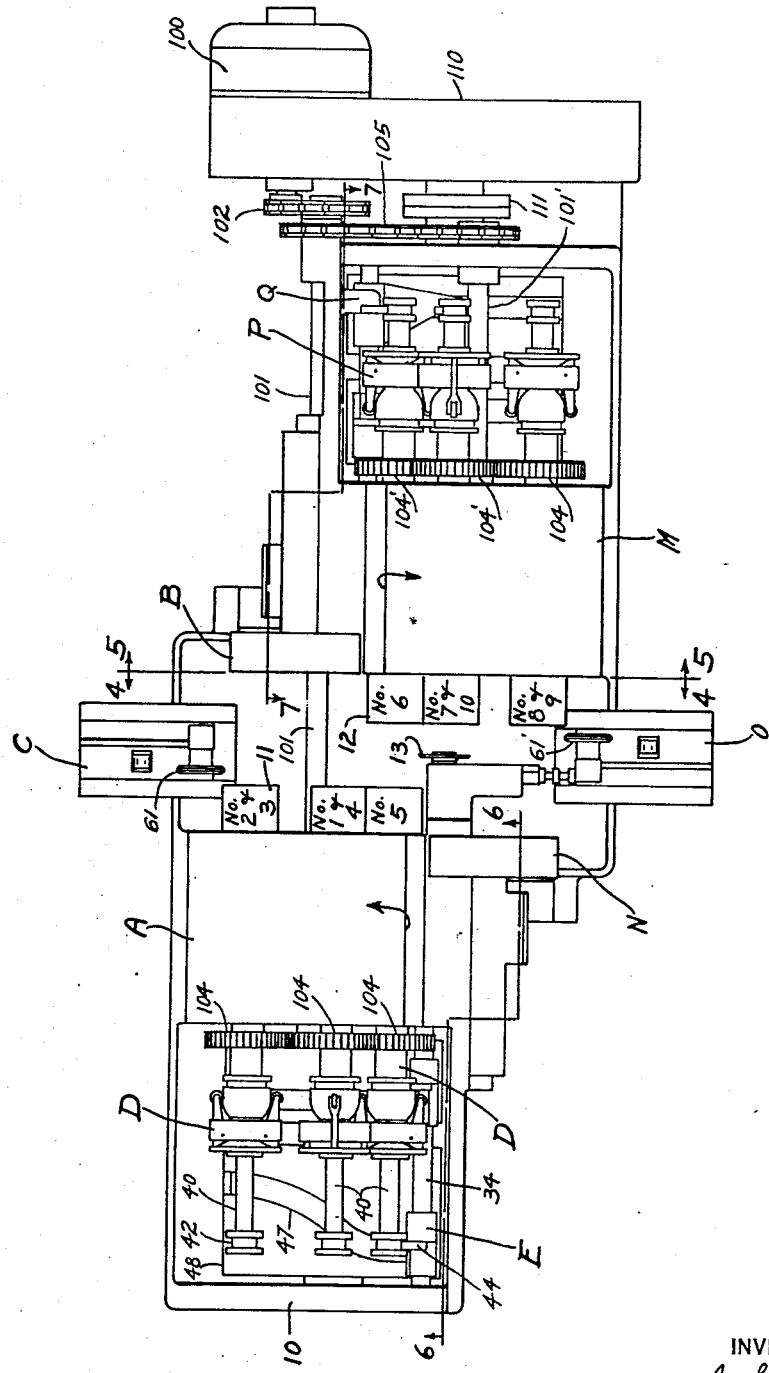
Fig. 1 is a plan view of a screw-machine made according to this invention.
Figure 2:
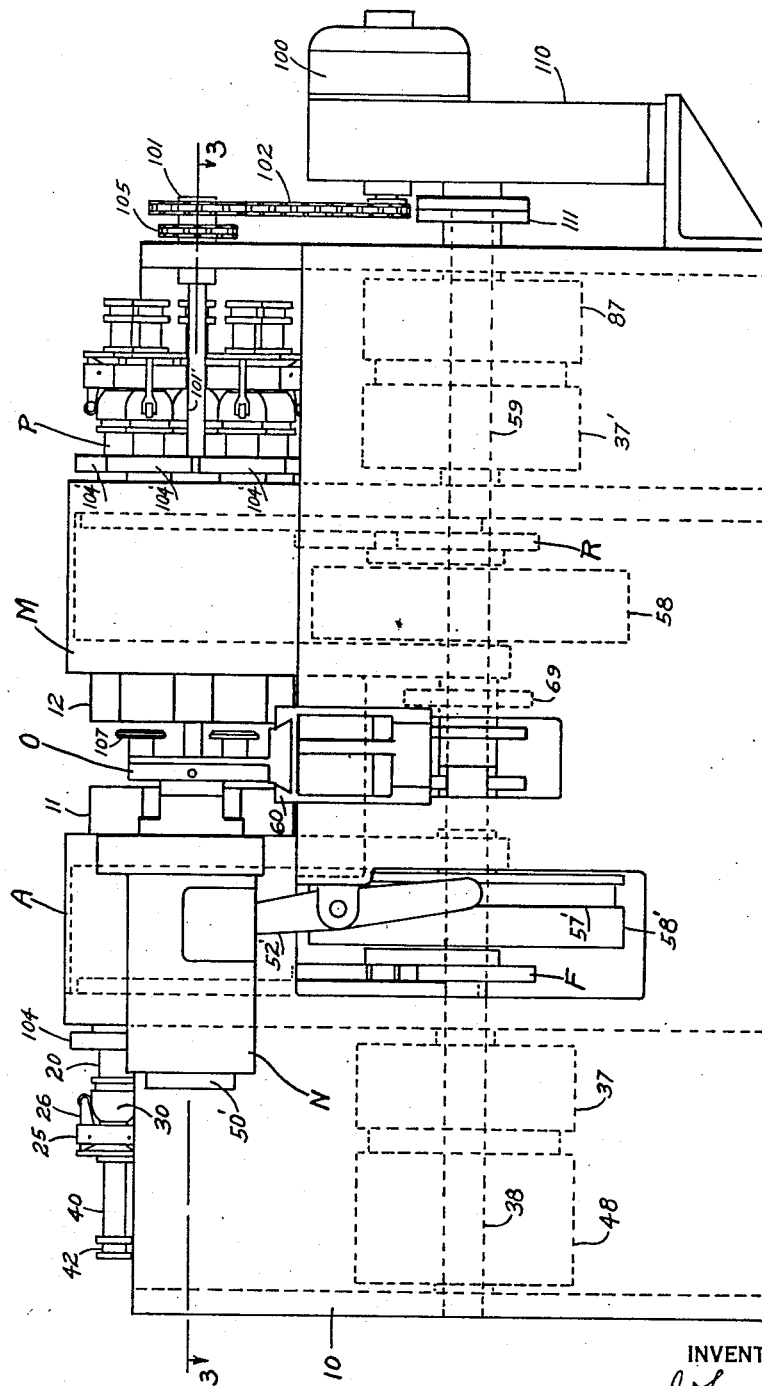
Fig. 2 is a front elevation thereof.

Figs. 1, 2, and 3 show the relative positions of the main groups of mechanisms above enumerated as they are mounted upon the stationary framework 10 of the automatic screw-machine.

Both the primary and secondary spindle-heads A and M are shown as each having five spindles 11 and 12 respectively, all the spindles of both heads being rotated in the same direction by power means here below described. The spindles 11 of head A are intermittently indexed successively through positions Nos. 1, 2, 3, 4, and 5 by the Geneva indexing mechanism F (see Fig. 4). The spindles 12 of head M are intermittently indexed successively through positions Nos. 6, 7, 8, 9, and 10 by the Geneva indexing mechanism R (see Fig. 5). The indexing rotation of both heads A and M takes place simultaneously as indicated by the bottom time-chart of Fig. 11. The heads A and M are faced opposite to each other but off-set laterally so that a spindle 11 in position No. 5 on head A is in direct alignment with a spindle 12 in position No. 6 on head M (see Figs. 1 and 3). This is an essential feature of this invention since by this means the work-piece may be fed from position 5 of head A into position 6 of M and then be gripped by suitable collets or chucks in both of the opposed spindles which are rotated in the same direction and at exactly the same speed. Thereafter the work-piece is cut off from the original bar-stock by the cut-off tool 13, and thus the work-piece is separated from the primary spindle head A and left automatically chucked in the secondary spindle-head M, whereupon it is indexed through the successive positions 6, 7, 8, 9, and 10 on head M where it may be further worked upon by any suitable end-working or forming tools as illustrated diagrammatically in Fig. 10. In position No. 10, which is the final position, the finished work-piece is automatically knocked out by the knock-out mechanism Q, and thus at the next indexing movement of head M when this particular spindle passes to position No. 6 it will be vacant and hence ready to receive the next work-piece as it is projected forward from a spindle on the primary head A in the aligned position No. 5. Thus the cycle of operations may be repeated continuously.

It will now be clear that the primary object of this invention is to provide a double automatic screw-machine having two opposed spindle-heads each having its own cutting tools, and having means whereby the work-piece may be automatically transferred from one spindle head to the other without stopping the rotating of the spindles. The great advantage of this invention of course is that it eliminates the necessity of rechucking by hand of any screw-machine made parts which have to be further formed after they are cut off from the bar-stock.

Any well-known and suitable type of spindle-heads, tool carriages, tool slides, spindle chucking mechanisms, or spindle feeding mechanisms may be used with this invention, but I have illustrated in the drawings certain suitable forms of these mechanisms which will now be described in more detail.

The spindle-head A has five spindles 11, each of which has a reciprocated collet sleeve 20 therein having three splits 21 in its gripping end and three tapered gripping members 22 which are cammed inwardly by their surrounding tapered collar 23 on the spindles 11 (see Fig. 3). Collect sleeve 20 is moved to the right or left by the chucking mechanism D to cause the gripping members 22 to grip or release the bar-stock which is passed therethrough. This mechanism D comprises a cam and lever mechanism mounted upon the rotating spindle 11. A collar 25 is fixed to each spindle 11 and upon each collar 25 are pivoted two small cam levers 26 which engage a collar 27 on the end of collet sleeve 20 and force it to the left as seen in Fig. 3. Collar 27 is urged to the right by the two small coil springs 28 which engage the heads of pins 29 which are fixed to the collar 27. Cam levers 26 are actuated by an annular cam 30 slidably mounted upon each spindle sleeve 11 and each having a groove 31 therein within which a reciprocating tongue 32 falls whenever cam 30 moves to position No. 5 (see Figs. 3 and 8). When tongue 32 moves to the left as shown by the arrow in Fig. 3, the two levers 26 will be forced to pivot in the direction shown by the arrow which in turn will cam collar 27 to the left as shown by the arrow, thereby moving collet sleeve 20 to the left and causing the gripping members 22 to cam closed and grip the inserted bar-stock (not shown). When tongue 32 moves to the right (as seen in Fig. 3) the coil springs 28 will force sleeve 27 to the right thereby disengaging the gripping members 22 from their surrounding collar 23 and thus ungripping or freeing the inserted bar-stock. The tongue 32 projects from a sliding collet-actuating head 33 mounted upon two stationary rods 34 (see Figs. 6 and 8). Head 33 has a cam roller 35 projecting therefrom which rides within the cam groove 36 on the large cam 37 fixed to the power driven cam shaft 38. This cam groove 36 is so designed as to actuate the collet 20 according to the second time-chart in Fig. 11. When the collet 20 frees the work-stock it can be slipped forward, i. e., to the right in Fig. 3, by the feeding mechanism E.

This mechanism E for feeding the bar stock comprises a long sleeve 40 telescoped within each of the collet sleeves 20 (see Fig. 3) into which the long bar stock is inserted and held therein by suitable friction means such as by the separated spring-like friction fingers of sleeve 40 caused by the slots 41 therein. These feed sleeves 40 each has a collar 42 having an annular groove 43 therein. A tongue 44 falls within the groove 43 whenever that particular spindle is moved to position No. 5 (see Figs. 3 and 6). Tongue 44 projects from a sliding feeding head 45 which is mounted upon the two stationary rods 34. Head 45 has a cam roller 46 projecting therefrom which rides within the cam groove 47 on the large cam drum 48 fixed to the power-driven cam shaft 38. This cam groove 47 is so designed as to actuate the feed sleeve 40 to the right or left as seen in Fig. 3 according to the first time-chart in Fig. 11 whenever sleeve 40 is moved to the right its friction fit upon the bar stock carries the bar to the right and projects its outer end through the chucking collet 22 and thus projects the end of the bar stock beyond the spindle 11. Thereafter collet 22 closes and grips the bar-stock, hence the return movement of sleeve 40 does not move the bar but merely slides thereover due to its friction hold thereupon. Thus collet 22 opens and the bar-stock is fed forward according to time-charts 1 and 2 of Fig. 11.

After the bar stock is chucked in spindle 11 as above described, the spindle-head A is indexed to bring the work to position No. 1 where the cutting operations begin. The work-piece is indexed successively through positions Nos. 1, 2, 3, and 4 in all of which work may be done thereupon by various side and end-cutting tools as in any well-known type of automatic screw-machine and as indicated diagrammatically in Fig. 10.

The end-cutting tools 51 are carried by the primary tool carriage B whose actuation is best shown in Figs. 5 and 7. Carriage B is slidably supported upon the stationary dovetail projection 50 and is moved back and forth according to the third time-chart of Fig. 11 to cause its various cutting tools 51 (shown in Fig. 10) to engage and cut the work-piece. Carriage B is actuated by a heavy cam lever 52 pivoted at the stationary pivot 53. A cam 54 at the upper end of lever 52 engages a cam slot 55 in the carriage B (see Fig. 7). The lower end of lever 52 has a cam roller 56 projecting therefrom which rides within a cam groove 57 in the large cam drum 58 fixed to the power-driven secondary cam shaft 59 (see Fig. 5). Cam groove 57 is so designed as to move tool carriage B according to the third time-chart of Fig. 11.

The side-cutting tools are carried by the primary tool slide C whose actuation is best shown in Fig. 4. Tool slide C is slidably mounted upon a stationary base 60 and carries the various side-cutting tools 61 two of which are shown in Fig. 4 and others are shown diagrammatically in Fig. 10. Tool slide C is actuated by a heavy cam lever 62 pivoted at the stationary pivot 63. A cam 64 at the upper end of lever 62 engages a cam slot 65 in slide C. The lower end of lever 62 has a cam roller 66 which rides upon the peripheral face of cam 67 fixed to the primary cam shaft 38 (see Fig. 4). Cam 67 is so designed as to move tool slide C according to the fourth time-chart of Fig. 11. The time-charts clearly show that the end-cutting tools 51 do work at the same time as the side-cutting tools 61. Any desired arrangement of side and end-cutting tools 61 and 51 may be had in the successive spindle positions Nos. 1, 2, 3, and 4 since these positions are all available for cutting work upon the work-piece, as in any known type of single automatic screw-machine.

When the work-piece is indexed from position 4 to position 5 it is still attached to the bar stock and hence the next forward feeding of the bar stock, as above described, will project the outer finished end of the work-piece into the then open secondary spindle 12 in position 6 of the secondary spindle-head M, which is at that time in alignment therewith and rotating in the same direction at the same speed as previously described herein. The collets 22' and their actuating mechanisms P of the secondary spindles may be similar to or identical with the collets 22 of the primary spindles and hence further detail description of these parts is unnecessary. Collets 22' in positions 6 and 10 are opened and closed by the long arcuate tongue 32' actuated by mechanism P (see Fig. 9) according to the seventh time-chart of Fig. 11. When the outer end of the work-piece is projected into the secondary collet 22' in position 6 it closes simultaneously with the primary collet 22 in position 5, hence for this portion of the cycle the work is gripped by both collet 22 and collet 22', even though these collets are in separate spindle-heads. This is the reason it is necessary that the spindle 11 must rotate in the same direction and at the same speed as spindle 12, at least while these two aligned spindles are in the positions Nos. 5 and 6 respectively. Now, before any further indexing of either spindle head A or M, the work-piece is cut off from the bar-stock by the cut-off tool 13 which is mounted upon and moved with the secondary tool slide O (see Figs. 3 and 4). Hence the fifth time-chart of Fig. 11, which shows the timing of the secondary tool slide, also shows the timing of the cut-off operation. After the work-piece is cut off its finished end remains gripped in the secondary collet 22' and hence is thereafter indexed to the positions Nos. 7, 8, and 9 on the secondary head, at each of which it may have work done upon it by both end-cutting and side-cutting tools, as illustrated diagrammatically in Fig. 10. Thus the projecting cut-off end of the work may be finished automatically by any known or suitable kind of tools. It is to be noted that after the work-piece is cut off, the bar stock remains projecting from the spindle 11 in the primary head A the correct distance to form the next work-piece without any further forward feeding of the bar-stock. Thus after the next simultaneous indexing movement of both the spindle-heads A and M, each spindle head and its accompanying units proceeds to do work upon the pieces gripped in their several spindles independently of each other.

As stated above, the secondary tool-slide O and its actuating mechanism may be similar to or identical with the primary tool slide C, hence further detail description of these parts is unnecessary. This slide O is actuated by cam lever 62' and cam 67' which is fixed to the secondary cam shaft 59 (see Fig. 4). Cam shaft 59 is geared to cam shaft 38 by the two gears 68 and 69 and hence rotate in opposite directions as shown by the arrows in Fig. 4.

The secondary tool-carriage N and its actuating mechanism is similar to or identical with the primary tool carriage B. Tool carriage N is actuated by cam lever 52', cam roller 56' and large cam 58' fixed to the power-driven primary cam shaft 38 (see Fig. 4).

The means F for indexing the primary spindle-head A by means of a Geneva gear and lock mechanism is shown in Fig. 4. A Geneva gear wheel 70 is mounted upon a stationary pivot 71 and has four slotted arms 72 and four arcuate locking surfaces 73. An arm 74 is fixed to and driven by cam shaft 38 and has a laterally projecting pin 75 thereon which engages the slots in arms 72 of wheel 70 and thus rotates wheel 70 a quarter revolution for each revolution of arm 74. Also a disk 76 having an arc 77 cut therefrom is fixed to and driven by cam shaft 38. Disk 76 mates with the arcuate portions 73 of the Geneva wheel 70 and so locks it against turning except at the speed it is driven by the arm 74 and holds it in locked position at other times. The cut-out portion 77 of disk 76 permits the arms 72 of wheel 70 to rotate by giving proper clearance thereto. This Geneva wheel and lock mechanism is well-known and needs no further illustration or description. Wheel 70 has a large gear 78 thereon which drives primary head A through its large gear 79 as shown in Figure 4. By this means the primary spindle head A is intermittently rotated one-fifth of a revolution at a time and held locked in its rotated position until the next indexing movement thereof. Thus its spindles 11 are intermittently and accurately indexed to the five positions thereon. The ninth time-chart of Fig. 11 shows that the indexing movement of both spindle heads A and M occurs from 0° to 90°, that is, while all other intermittently movable parts of the machine are stationary.

The indexing mechanism R for indexing the secondary spindle head M may be the same as that above described, as clearly shown in Fig. 5. Similar reference numerals refer to similar parts in Figs. 4 and 5. The disk 76' is fixed to and driven by the secondary cam shaft 59.

It will now appear from above descriptions that the primary cam shaft 38 indexes the primary spindle-head A, actuates the primary tool slide C, but actuates the secondary tool carriage N. Also that the secondary cam shaft 59 indexes the secondary spindle-head M, actuates the secondary tool-slide O, but actuates the primary tool carriage B.

There yet remains to be described the work knock-out mechanism Q, which ejects the finished work-piece from the spindle 12 in the last position No. 10 of the secondary head M (see Figs. 3, 7, and 9). It has been described hereinabove that the secondary collet 22' is opened in both positions Nos. 6 and 10 simultaneously by the mechanism P. The opening of collet 22' in position No. 10 is to permit the ejection of the finished work-piece by the mechanism Q which is somewhat similar to the feed mechanism E described above. Each secondary collet sleeve 20' has a knock-out plunger 80 reciprocatably mounted therein (see Fig. 3) and having a collar 81 thereon on its outwardly projecting rear end. Each collar 81 has an annular groove 82 therein within which a tongue 83 falls whenever that spindle is in position 10. Tongue 83 projects laterally from a sliding head 84 which is mounted upon and guided by the two stationary bars 34'. Head 84 is reciprocated to and fro on bars 34' by a laterally projecting cam roller 85 which rides in cam groove 86 on cam drum 87 which is driven by cam shaft 59 (see Fig. 7). Cam groove 86 is so designed as to move the knock-out plunger 80 to the left (as seen in Fig. 3) according to the eighth time chart of Fig. 11. Note that the secondary collet 22' in position 10 is open while plunger 80 is moving and hence the work-piece is easily ejected thereby. The work-piece may fall upon a suitable chute (not shown) and be carried away by gravity to a container or to a suitable conveyor. Plunger 80 is returned to a definite inner position by cam groove 86 and hence the work-contacting end 88 of plunger 80 may be and preferably is used as a stop for the work-piece when it is fed forward into the secondary spindle 12 by the feed mechanism E. This permits the feed mechanism E to engage the bar-stock by the simple friction grasping fingers on feed sleeve 40 as above described. The feeding movement of feed sleeve 40 preferably is slightly in excess of the necessary movement of the bar stock to take care of the possibility of the friction fingers not moving the bar stock a certain definite distance without some slip. After the work-piece engages the end 88 of plunger 80 it is definitely stopped in its correct position and any further movement of feed sleeve 40 causes the friction fingers to slip on the bar-stock. Fig. 11 shows the work-piece entirely ejected from its collet 22' and ready to drop by gravity therefrom. This is the only case in the entire drawings where the intermittently moving parts are not shown in the 0° position represented in the time-charts of Fig. 11.

The mechanism for driving the essential elements of the machine as above described may be of any suitable design. I have shown for illustration purposes an electric motor 100 for driving the primary spindle drive shaft 101 through the sprocket and chain drive 102 (see Figs. 1 and 2). Shaft 101 passes through the center of primary head A and has a gear 103 fixed to its left end as seen in Fig. 3. Gear 103 meshes with and drives all five spindle gears 104 which are fixed to and drive the primary spindles 11 constantly without in any way interfering with the indexing movement of the primary head A.

The secondary spindle drive shaft 101' is geared to and driven by the primary spindle drive shaft 101 by the sprocket and chain drive 105 (see Figs. 1 and 2). Shaft 101' has a bearing 106 at the center of the secondary head M and has a gear 103' fixed thereto as shown in Fig. 3. Gear 103' meshes with and drives all five spindle gears 104' which are fixed to and drive the secondary spindles 12 constantly without interfering with the indexing movement of head M.

The secondary cam shaft 59 is driven at a much slower and suitable speed by being geared to the motor 100 through the gear reduction box 110 shown diagrammatically in Figs. 1 and 2. 111 is the shaft coupling between the gear reduction box and the cam shaft 59. The primary cam shaft 38 is driven at the same speed as shaft 59 by being geared thereto through the two equal gears 68, 69 as described above and as best shown in Fig. 4.

While the embodiment of the present invention as herein disclosed, constitutes a preferred form, it is to be understood that other forms might be adopted, all coming within the scope of the claims which follow.

What is claimed is as follows:

1. An automatic screw-machine having a primary spindle-head having a plurality of constantly rotating spindles indexable to successive positions around said head, means for successively feeding stock bars through said primary spindles only at one indexed position, a secondary spindle-head having a plurality of constantly rotating spindles indexable to successive positions around said secondary head, said secondary head facing said primary head but offset therefrom so that the initial spindle position of said secondary head is in alignment with the stock-feeding position of said primary head, means on said secondary spindles for receiving and automatically chucking the outer end of the partially finished work when the stock bar is fed forward, means for cutting the work-piece from said bar while chucked in both primary and secondary spindles in said aligned positions and thereby freeing the work-piece from the primary head, and means for thereafter further working on the projecting cut-off end of said work-piece as it successively passes through the successive spindle-positions on said secondary head.

2. An automatic screw-machine having a primary spindle-head having a plurality of constantly rotating spindles indexable to successive positions around said head, means for successively feeding stock bars through said primary spindles only at one indexed position, a secondary spindle-head having a plurality of constantly rotating spindles indexable to successive positions around said secondary head, said secondary head facing said primary head but offset therefrom so that the initial spindle position of said secondary head is in alignment with the stock-feeding position of said primary head, means on said secondary spindles for automatically chucking the outer end of the partially finished work when the stock bar is fed forward while said primary and secondary spindles are in their aligned positions, a side-cutting tool for cutting the work-piece from said bar while chucked in both primary and secondary spindles in said aligned positions and thereby freeing the work-piece from the primary head, and an end-cutting tool associated with said secondary head for thereafter working on the projecting end of said work-piece.

3. An automatic screw-machine having a primary spindle-head having a plurality of constantly rotating spindles indexable to successive positions around said head, means for feeding stock bars through said primary spindles only at one indexed position, a secondary spindle-head having a plurality of constantly rotating spindles indexable to successive positions around said secondary head, said secondary head facing said primary head but offset therefrom so that the initial spindle position of said secondary head is in alignment with the stock-feeding position of said primary head, means on said secondary spindles for chucking the outer end of the work when the stock bar is fed forward while said primary and secondary spindles are rotating in their aligned positions, a cut-off tool for cutting the work-piece from said bar while said spindles are so aligned after its outer end has been chucked in the secondary spindle, and means for thereafter further working on the cut-off end of said work-piece as it passes through the successive spindle-positions on said secondary head.

4. An automatic screw-machine having a primary spindle-head having a plurality of constantly rotating spindles indexable to successive positions around said head, means for feeding stock bars through said primary spindles only at one indexed position, a secondary spindle-head having a plurality of constantly rotating spindles indexable to successive positions around said secondary head, said secondary head facing said primary head but offset therefrom so that the initial spindle position of said secondary head is in alignment with the stock-feeding position of said primary head, means associated with each of said secondary spindles for automatically chucking the outer finished end portion of the bar stock when said bar stock is fed forward while said primary and secondary spindles are in their aligned positions, means for cutting off the work-piece from said bar while its outer end is chucked in said secondary spindle and thereby freeing said work-piece from said primary head, and tools associated with said secondary spindle-head for thereafter working on said work-piece as it passes through the spindle-positions on said secondary head.

5. An automatic screw-machine having a primary spindle-head and a secondary spindle-head, each having a plurality of constantly rotating spindles intermittently indexable to successive positions therearound, said two spindle heads facing each other but being relatively offset so that the stock-feeding spindle-position of said primary head is in alignment with the initial spindle-position of said secondary head, means for successively feeding stock into each of said primary spindles only when each is indexed into aligned position, chucking means associated with each of said secondary spindles for automatically chucking the outer finished end portion of the stock while each secondary spindle is in its initial position, means for cutting the work-piece from the stock after said outer end is chucked in said secondary spindle, and means for thereafter working on said work-piece while it remains chucked in said secondary spindle.

6. An automatic screw-machine for successively cutting a plurality of parts from bar stock and having a primary spindle-head and a secondary spindle-head, each having a plurality of continuously rotating spindles intermittently indexable to successive positions thereabound, said two spindle-heads facing each other but being relatively offset so that the stock-feeding spindle-position on said primary head is in alignment with the initial spindle position on said secondary head, and means for successively automatically transferring the work from a chucked position in one of said primary spindles to a chucked position in the aligned secondary spindle while said spindles continue to rotate at the same speed, and a series of cutting tools individually associated with each spindle-head for cutting the work while held chucked in its spindle-head.

7. An automatic screw-machine having a primary spindle-head and a secondary spindle-head, each having a plurality of constantly rotating spindles intermittently indexable to successive positions thereabound, said two spindle-heads facing each other but being relatively offset so that the stock-feeding spindle-position of said primary head is in alignment with the initial spindle-position of said secondary head, means for successively feeding stock forward in each of said primary spindles when each is indexed into its stock-feeding position, a primary tool-carriage having a series of tools for cutting the work while held in various indexed positions in said primary head, automatic chucking means associated with the secondary spindles for gripping the outer end of the work when the bar stock is fed forward in said aligned primary spindle as each secondary spindle is indexed to its initial position, a cut-off tool for cutting the partly finished work-piece from the bar-stock after the outer end thereof is gripped in said secondary spindle, and a secondary tool-carriage having a series of tools for cutting the work while held in various indexed positions in said secondary head.

8. An automatic screw-machine for successively cutting a plurality of parts from bar stock and having a primary spindle-head and a secondary spindle-head, each having a plurality of continuously rotating spindles intermittently indexable to successive positions thereabound, said two spindle-heads facing each other but being relatively offset so that the stock-feeding spindle-position of said primary head is in alignment with the initial spindle-position of said secondary head, means for successively feeding stock forward in each of said primary spindles as each is indexed into its initial position, a primary tool carriage and a primary tool slide having tools for cutting the work while held in various indexed positions in said primary head, means for automatically transferring the partly-formed work from a gripped position in a spindle of said primary head to a gripped position in a spindle of said secondary head while said spindles continue to rotate in aligned positions, and a secondary tool-carriage and secondary tool-slide having tools for cutting the work while held in various indexed positions in said secondary head.

9. An automatic screw-machine for making parts from bar stock and having a primary spindle-head and a secondary spindle-head, each having a plurality of continuously rotating spindles intermittently indexable to successive positions thereabound, said two spindle-heads facing each other but being relatively offset so that one spindle-position on said primary head is in alignment with one spindle-position on said secondary head, and automatic means for successively feeding the work forward from each primary spindle into the aligned secondary spindle and automatically chucking same into both said aligned spindles while said aligned spindles are kept rotating at the same speed and in the same direction, cutter means for then severing the work-piece from the primary spindle, and means for thereafter working on said severed work-piece while chucked in said secondary spindle.

10. A machine as set forth in claim 9 having a cutoff means (13) for cutting off the end of the bar stock comprising the work-piece from the portion of the bar stock projecting into said primary spindle while said bar stock is held chucked in both constantly rotating aligned spindles.

11. A machine as set forth in claim 9 having a cutoff means (13) for cutting off the end of the bar stock comprising the work-piece from the portion of the bar stock projecting into said primary spindle immediately after the bar stock is chucked in said constantly rotating spindles, said cut-off means (13) being laterally movable against the rotating work.

12. A machine as set forth in claim 9 having means for successively automatically removing the work-piece from its chucked position in each spindle of said secondary head before said spindle is again indexed to its aligned position.

13. An automatic screw-machine for making parts from stock bars and having primary and secondary spindle-heads, each having a plurality of constantly rotating spindles, means for intermittently feeding stock bars forward successively in the spindles of said primary head, means for partly machining work pieces on the ends of said bars while held in said primary spindles, automatic means for successively transferring the partially-formed work-pieces into said secondary spindles and separating same from said bars while both said primary and secondary spindles continue to rotate at the same constant speed, and means for further machining said work-pieces while held in said secondary spindles.

14. An automatic screw-machine for making parts from bar stock and having a primary spindle-head and a secondary spindle-head, each spindle-head having a plurality of continuously rotating work-carrying spindles intermittently indexable to successive positions around said spindle-head, said two spindle-heads facing each other but being relatively offset so that the stock-feeding spindle position on said primary head is in alignment with the initial spindle position on said secondary head, means for automatically feeding the work while still integral with its bar stock from a chucked position in the primary spindle to a chucked position in the aligned secondary spindle while both of said spindles continue to rotate, cutter means for then severing the work from its bar stock, and means for thereafter working on said severed work while chucked in said secondary spindle.

JOHN W. LEE.